(12) United States Patent
Park et al.

(10) Patent No.: US 11,887,002 B2
(45) Date of Patent: Jan. 30, 2024

(54) METHOD OF GENERATING DATA BY USING ARTIFICIAL NEURAL NETWORK MODEL HAVING ENCODER-DECODER STRUCTURE

(71) Applicant: ActionPower Corp., Seoul (KR)

(72) Inventors: Seongmin Park, Seoul (KR); Jihwa Lee, Seoul (KR)

(73) Assignee: ActionPower Corp.

(*) Notice: Subject to any disclaimer, the term of this patent is extended or adjusted under 35 U.S.C. 154(b) by 0 days.

(21) Appl. No.: 17/880,415

(22) Filed: Aug. 3, 2022

(65) Prior Publication Data

US 2023/0409913 A1 Dec. 21, 2023

(30) Foreign Application Priority Data

Jun. 16, 2022 (KR) .................. 10-2022-0073324

(51) Int. Cl.
*G06N 3/08* (2023.01)
*G06N 3/082* (2023.01)
*G06N 3/04* (2023.01)

(52) U.S. Cl.
CPC .............. *G06N 3/082* (2013.01); *G06N 3/04* (2013.01)

(58) Field of Classification Search
CPC .................................. G06N 3/082; G06N 3/04
See application file for complete search history.

(56) References Cited

U.S. PATENT DOCUMENTS

| 10,671,889 | B2 | 6/2020 | Poole et al. | |
| 2020/0034436 | A1* | 1/2020 | Chen | G06N 3/08 |
| 2020/0167966 | A1* | 5/2020 | Kim | G06N 20/10 |
| 2021/0056348 | A1* | 2/2021 | Berlin | G06T 11/001 |
| 2021/0097387 | A1 | 4/2021 | Chidlovskii et al. | |
| 2021/0110892 | A1 | 4/2021 | Kwon et al. | |
| 2023/0019211 | A1* | 1/2023 | Wang | G06N 3/048 |

FOREIGN PATENT DOCUMENTS

| JP | 202156667 | 4/2021 |
| KR | 102173382 | 11/2020 |
| KR | 102203336 | 1/2021 |
| KR | 20210036845 | 4/2021 |

(Continued)

OTHER PUBLICATIONS

Korean Office Action dated Sep. 14, 2022, for Korean Application No. 10-2022-0073324, 5 pgs.

(Continued)

*Primary Examiner* — Brent Johnston Hoover
(74) *Attorney, Agent, or Firm* — Fish IP Law, LLP

(57) ABSTRACT

Disclosed is a method of generating data based on input data by using a pre-trained artificial neural network model having an encoder-decoder structure. In particular, according to the present disclosure, a computing device generates new data based on a probability distribution of input data by using a pre-trained artificial neural network model having an encoder-decoder structure, and the pre-trained artificial neural network model having the encoder-decoder structure corresponds to a pre-trained model in which a latent vector layer is included between an encoder layer and a decoder layer of the artificial neural network model.

8 Claims, 6 Drawing Sheets

(56) References Cited

FOREIGN PATENT DOCUMENTS

KR       20210042777       4/2021
KR   1020210141060 A   11/2021

OTHER PUBLICATIONS

Jaehoon Cha et al., "On the Transformation of Latent Space in Autoencorders", Department of Electrical and Electronic Engineering Xi'an, Jiaotong-Liverpool University, Suzhou, 215123, P. R. China, Jun. 3, 2019, 9 pages.
Bohan Li et al., "Surprisingly Effective Fix for Deep Latent Variable Modeling of Text", 1Language Technologies Institute, Carnegie Mellon University, Department of Computer Science and Engineering, University of California San Diego, Sep. 2, 2019, 12 pages.
Tianxiao Shen et al., "Educating Text Autoencoders: Latent Representation Guidance via Denoising", Proceedings of the 37th International Conference on Machine Learning, PMLR 119:8719-8729, 2020, 18 pages.
Lee et al., A Study on Data Augmentation Methods Optimized for Gastric Cancer Classification in Gastroscopy Images, DBpia ISSN 1975-8359 [Print] / ISSN 2287-4364 [Online], The Transactions of the Korean Institute of Electrical Engineers, vol. 70, No. 12, pp. 2015-2021, 2021, https://doi.org/10.5370/KIEE.2021.70.12.2015, 7 pages.

\* cited by examiner

METHOD OF GENERATING DATA BY USING ARTIFICIAL NEURAL NETWORK MODEL HAVING ENCODER-DECODER STRUCTURE

CROSS-REFERENCE TO RELATED APPLICATIONS

This application claims priority to and the benefit of Korean Patent Application No. 10-2022-0073324 filed in the Korean Intellectual Property Office on Jun. 16, 2022, the entire contents of which are incorporated herein by reference.

TECHNICAL FIELD

The present disclosure relates to a method of generating data, and more particularly, to a method of generating new data based on a probability distribution of input data by using a pre-trained artificial neural network model having an encoder-decoder structure in which a latent vector layer is inserted between an encoder layer and a decoder layer.

BACKGROUND ART

Recently, due to remarkable achievements in the field of machine learning including deep learning, research is being conducted in various fields.

Machine learning models may be broadly classified into discrimination models and generative models, and among them, the generative model means a model that can generate new data samples by learning latent variables expressing the generation process of input data.

Among the generative models, the variational autoencoder is the most commonly used generative model and has an encoder-decoder structure. However, in most cases, a phenomenon called posterior collapse occurs in the learning process of variational autoencoders, so learning about the distribution of input data is not performed properly in many cases. Posterior collapse refers to a phenomenon in which a network forgets all features of the data and outputs random results while data flows from the encoder to the latent layer.

Accordingly, there is a need in the art for a method to generate a generative model of an encoder-decoder structure without causing posterior collapse and generate data samples by using the properly trained generative model.

Prior Art Literature: Korean Patent No. KR 220336 B1 discloses a system and a method of optimizing experiments and generating experimental hypotheses by using a generative model.

SUMMARY OF THE INVENTION

The present disclosure has been conceived in response to the foregoing background art, and has been made in an effort to establish a generative model by inserting a latent vector layer into an artificial neural network of a pre-trained encoder-decoder structure and generate a new data sample from input data by using the generative model.

In order to solve the foregoing object, an exemplary embodiment of the present disclosure discloses a method for generating data based on input data. The method includes generating new data based on a probability distribution of input data by using a pre-trained artificial neural network model having an encoder-decoder structure, in which the pre-trained artificial neural network model having the encoder-decoder structure corresponds to a pre-trained model in which a latent vector layer is included between an encoder layer and a decoder layer of the artificial neural network model.

In the alternative exemplary embodiment, the pre-trained artificial neural network model having the encoder-decoder structure may correspond to an artificial neural network model pre-trained based on: pre-training the artificial neural network model having the encoder-decoder structure; inserting the latent vector layer between the encoder layer and the decoder layer of the artificial neural network model; and tuning the artificial neural network model so that the artificial neural network model denoises the input data.

In the alternative exemplary embodiment, the artificial neural network having the encoder-decoder structure may include a transformer.

In the alternative exemplary embodiment, the inserting of the latent vector layer between the encoder layer and the decoder layer of the artificial neural network model may include: transforming an output of the encoder layer into a pooling vector; transforming the pooling vector into a latent variable vector; and using the latent variable vector as an input value of the decoder layer through a projection matrix.

In the alternative exemplary embodiment, the using of the latent variable vector the input value of the decoder layer through the projection matrix may include performing cross attention of the decoder layer based on the latent variable vector and the projection matrix.

In the alternative exemplary embodiment, the pre-training of the artificial neural network model having the encoder-decoder structure may include pre-training the encoder layer until a value of a loss function of the encoder layer of the artificial neural network having the encoder-decoder structure becomes equal to or less than a threshold value.

In the alternative exemplary embodiment, the method may further include pre-training the artificial neural network model by using data in which at least a part of the data has been noised as input data of the artificial neural network model.

In the alternative exemplary embodiment, the using of the data in which at least a part of the data has been noised as the input data of the artificial neural network model may include: masking some of the input data of the artificial neural network model; and inputting the masked input data to the artificial neural network model, and the input data of the artificial neural network model may include text data.

In order to solve the foregoing object, another exemplary embodiment of the present disclosure discloses an artificial neural network model, more particularly, a method of training a generative model, the method including: pre-training an artificial neural network model having an encoder-decoder structure; inserting a latent vector layer between the encoder layer and a decoder layer of the artificial neural network model; and tuning the artificial neural network so that the artificial neural network denoises input data.

In order to solve the foregoing object, another exemplary embodiment of the present disclosure discloses a computer program for generating data based on input data, the program including an operation of generating new data based on a probability distribution of input data by using a pre-trained artificial neural network model having an encoder-decoder structure, in which the pre-trained artificial neural network model having the encoder-decoder structure corresponds to a pre-trained model in which a latent vector layer is included between an encoder layer and a decoder layer of the artificial neural network model.

In order to solve the foregoing object, another exemplary embodiment of the present disclosure discloses a computing device for generating data based on input data, the computing device includes: a processor including one or more cores; a network unit for receiving one or more data; and a memory, in which the processor generates new data based on a probability distribution of input data by using a pre-trained artificial neural network model having an encoder-decoder structure, and the pre-trained artificial neural network model having the encoder-decoder structure corresponds to a pre-trained model in which a latent vector layer is included between an encoder layer and a decoder layer of the artificial neural network model.

An artificial neural network model, particularly, a generative model having an encoder-decoder structure, trained by the method of the present disclosure may generate new data based on a probability distribution of input data.

BRIEF DESCRIPTION OF THE DRAWINGS

The accompanying drawings for use in the description of the exemplary embodiments of the present disclosure are only some of the exemplary embodiments of the present disclosure, and other drawings may be obtained based on the drawings by a person of ordinary skill in the art to which the present disclosure belongs (hereinafter referred to as "a person skilled in the art") without an effort to arrive at a novel invention.

DETAILED DESCRIPTION

Figure 1:
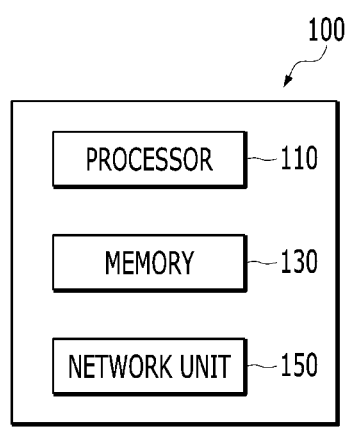
FIG. 1 is a block diagram of a computing device for generating data based on input data according to an exemplary embodiment of the present disclosure.

The present disclosure discloses to a method of generating new data based on a probability distribution of input data by using a pre-trained artificial neural network model having an encoder-decoder structure in which a latent vector layer is inserted between an encoder layer and a decoder layer.

Various exemplary embodiments are described with reference to the drawings. In the present specification, various descriptions are presented for understanding the present disclosure. However, it is obvious that the exemplary embodiments may be carried out even without a particular description.

Terms, "component", "module", "system" and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or" not exclusive "or". That is, unless otherwise specified or when it is unclear in context, "X uses A or B" intends to mean one of the natural comprehensive substitutions. That is, when X uses A, X uses B, or X uses both A and B, or "X uses A or B" may be applied to any one among the cases. Further, a term "and/or" used in the present specification shall be understood to designate and include all of the possible combinations of one or more items among the listed relevant items.

It should be understood that a term "include" and/or "including" means that a corresponding characteristic and/or a constituent element exists. Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear in context that a single form is indicated, the singular shall be construed to generally mean "one or more" in the present specification and the claims.

The term "at least one of A and B" should be interpreted to mean "the case including only A", "the case including only B", and "the case where A and B are combined".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, such implementation decisions should not be interpreted as causing a departure from the scope of the present disclosure.

Descriptions of the presented exemplary embodiments are provided to enable a person skilled in the art to use or practice the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

In the present disclosure, a network function, an artificial neural network, and a neural network may be interchangeably used.

In the present disclosure, a latent vector may be a pair of latent variables, which are conditions that determine the appearance of an actually existing object or situation.

In the present disclosure, VAE is an abbreviation of Variational AutoEncoder, and may be an artificial neural network model having an encoder-decoder structure in which a decoder layer generates new data by learning a probability distribution of input data. The decoder layer of the variational autoencoder generates new data samples from the latent vector, and the encoder layer may transform the characteristics of the input data into the latent vector. The variational autoencoder has a similar structure to the autoencoder, which is one of the discrimination models for classifying input data, but function as a generative model that generates new data from the input data due to the latent vector layer existing between the encoder and the decoder.

In the present disclosure, the transformer may mean an artificial neural network model implemented in a way that connects an encoder layer and a decoder layer by using a plurality of attention heads and different attentions without using a long short-term memory (LSTM) or a recurrent neural network while having an encoder-decoder structure.

FIG. 1 is a block diagram of a computing device for generating data based on input data according to an exemplary embodiment of the present disclosure.

The configuration of a computing device 100 illustrated in FIG. 1 is merely a simplified example. In the exemplary embodiment of the present disclosure, the computing device 100 may include other configurations for performing a computing environment of the computing device 100, and only some of the disclosed configurations may also configure the computing device 100.

The computing device 100 may include a processor 110, a memory 130, and a network unit 150.

The processor 110 may be formed of one or more cores, and may include a processor, such as a central processing unit (CPU), a general purpose graphics processing unit (GPGPU), and a tensor processing unit (TPU) of the computing device, for performing a data analysis and deep learning. The processor 110 may read a computer program stored in the memory 130 and process data for machine learning according to an exemplary embodiment of the present disclosure. According to the exemplary embodiment of the present disclosure, the processor 110 may perform calculation for training a neural network. The processor 110 may perform a calculation, such as processing of input data for training in Deep Learning (DL), extraction of a feature from input data, an error calculation, and updating of a weight of the neural network by using backpropagation, for training the neural network.

At least one of the CPU, GPGPU, and TPU of the processor 110 may process training of a network function. For example, the CPU and the GPGPU may process training of the network function and data classification by using a network function together. Further, in the exemplary embodiment of the present disclosure, the training of the network function and the data classification by using a network function may be processed by using the processors of the plurality of computing devices together. Further, the computer program executed in the computing device according to the exemplary embodiment of the present disclosure may be a CPU, GPGPU, or TPU executable program.

The artificial neural network model of the encoder-decoder structure of the present disclosure may include an autoencoder and a transformer.

According to the exemplary embodiment of the present disclosure, the processor 110 may perform pre-training of the artificial neural network model of the encoder-decoder structure. Pre-training may be performed before fine-tuning (hereinafter, 'tuning') of the model as part of transfer learning. Fine-tuning may refer to a method of modifying a model architecture for a new purpose based on an existing trained model, or updating the learning of a model by using weights of an already trained model.

According to an exemplary embodiment of the present disclosure, the processor 110 may configure an artificial neural network model by pre-training the encoder layer (encoder warm-up) until a value of the loss function becomes equal to or less than a threshold value as pre-training of the artificial neural network model of the encoder-decoder structure, and then combining a latent vector layer and a decoder layer. For example, the loss function may be defined as a portion excluding Kullback-Leibler Divergence (KLD) from Evidence Lower Bound (ELBO), but the present disclosure is not limited thereto.

As another exemplary embodiment, the processor 110 may train the artificial neural network model by using the data in which at least a part of the data is corrupted (noise) as input data of the artificial neural network model as pre-training of the artificial neural network model of the encoder-decoder structure. For example, as a method of corrupting the data, a method of masking a part of input data may be used. When the input data of the artificial neural network model is text data or array data, the data masking may be performed by randomly deleting at least some words or constituent elements of the array from among text data or array data and replacing the deleted portion with a masking token. However, the present disclosure is not limited to the masking method. In addition to array data or text data, various types of data may be masked and used for pre-training of the artificial neural network model of the encoder-decoder structure. Alternatively, data may be corrupted by deleting at least some words of the text data or only some constituent elements of the array data.

The processor 110 may individually use the above-mentioned pre-training methods of the artificial neural network model of the encoder-decoder structure, or various pre-training methods which are not mentioned above, or may use the pre-training methods simultaneously.

In particular, in the present disclosure, in order to make a model robust, a method of pre-training an encoder layer and a method of corrupting input data may be simultaneously utilized. For example, in the case of independently using the method of corrupting the input data, there is a possibility that posterior collapse occurs in the encoder-decoder model including the decoder including many layers. On the other hand, in the case where the method of pre-training the encoder layer is used independently, posterior collapse may occur depending on the hyperparameter determined during training, and the output of the encoder may not be sufficiently improved. Therefore, in the case where the artificial neural network model of the encoder-decoder structure is pre-trained by using both the method of pre-training the encoder layer and the method of corrupting the input data, even when the layers of the encoder and the decoder are complex, the finally completed model may exhibit robust performance.

According to the exemplary embodiment of the present disclosure, the processor 110 may transform the artificial neural network model into a generative model by inserting a latent vector layer between the encoder layer and the decoder layer of the pre-trained artificial neural network model of the encoder-decoder structure. Details of inserting the latent vector layer will be described later with reference to FIG. 3.

According to the exemplary embodiment of the present disclosure, the processor 110 may perform tuning of the artificial neural network in which the latent vector layer is inserted between the encoder layer and the decoder layer and the pre-training has been performed. For example, the processor 110 may design a loss function so that the artificial neural network outputs output data similar to the input data and tune the artificial neural network model in a direction to minimize the loss function. By using the method of modifying an architecture of the pre-trained artificial neural network model and tuning the model, the artificial neural network model may be properly trained by using the weights already formed in the pre-training process.

According to the exemplary embodiment of the present disclosure, the processor 110 may generate new data from the input data by using the artificial neural network model that has undergone the pre-training, the insertion of the latent vector layer, and the tuning. Since the artificial neural network model has been properly pre-trained, it is possible to stably generate new data without causing the posterior collapse phenomenon that is common in the generative model of the encoder-decoder structure.

According to the exemplary embodiment of the present disclosure, the memory 130 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The computing device 100 may also be operated in relation to web storage performing a storage function of the memory 130 on the Internet. The description of the foregoing memory is merely illustrative, and the present disclosure is not limited thereto.

The network unit 150 according to several exemplary embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-1-DMA), and other systems.

In the present disclosure, the network unit 150 may use any type of wired/wireless communication system.

The technologies described in the present specification may be used in other networks, as well as the foregoing networks.

Figure 2:
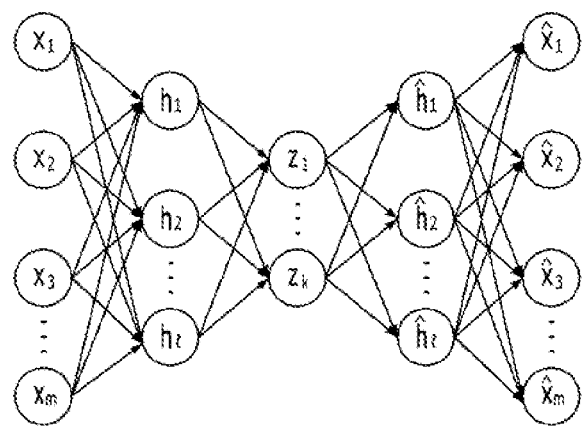
FIG. 2 is a schematic diagram illustrating a network function according to the exemplary embodiment of the present disclosure.

FIG. 2 is a schematic diagram illustrating a network function according to the exemplary embodiment of the present disclosure.

Throughout the present specification, the meanings of a calculation model, a nerve network, the network function, and the neural network may be interchangeably used. The neural network may be formed of a set of interconnected calculation units which are generally referred to as "nodes". The "nodes" may also be called "neurons". The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weight values between the links are different, the two neural networks may be recognized to be different from each other.

The neural network may consist of a set of one or more nodes. A subset of the nodes configuring the neural network may form a layer. Some of the nodes configuring the neural network may form one layer on the basis of distances from an initial input node. For example, a set of nodes having a distance of n from an initial input node may form n layers. The distance from the initial input node may be defined by the minimum number of links, which need to be passed to reach a corresponding node from the initial input node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the exemplary embodiment of the present disclosure, the number of nodes of the input layer may be the same as the number of nodes of the output layer, and the neural network may be in the form that the number of nodes decreases and then increases again from the input layer to the hidden layer. Further, in the neural network according to another exemplary embodiment of the present disclosure, the number of nodes of the input layer may be smaller than the number of nodes of the output layer, and the neural network may be in the form that the number of nodes decreases from the input layer to the hidden layer. Further, in the neural network according to another exemplary embodiment of the present disclosure, the number of nodes of the input layer may be larger than the number of nodes of the output layer, and the neural network may be in the form that the number of nodes increases from the input layer to the hidden layer. The neural network according to another exemplary embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a Long Short-Term Memory (LSTM), a transformer, a restricted Boltzmann machine (RBM), a deep belief network (DBN), a Q network, a U network, a Siamese network, a Generative Adversarial Network (GAN), and the like. The foregoing description of the deep neural network is merely illustrative, and the present disclosure is not limited thereto.

In the exemplary embodiment of the present disclosure, the network function may include an auto encoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). The auto encoder may perform a nonlinear dimension reduction. The number of input layers and the number of output layers may correspond to the dimensions after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, a half or more of the number of nodes of the input layer and the like).

The neural network may be trained by at least one scheme of supervised learning, unsupervised learning, semi-supervised learning, and reinforcement learning. The training of the neural network may be a process of applying knowledge for the neural network to perform a specific operation to the neural network.

The neural network may be trained in a direction of minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A change amount of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the training of the neural network, the training data may be generally a subset of actual data (that is, data to be processed by using the trained neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of nodes of the network during the training process, a method using a bath normalization layer, and the like may be applied.

Figure 3:
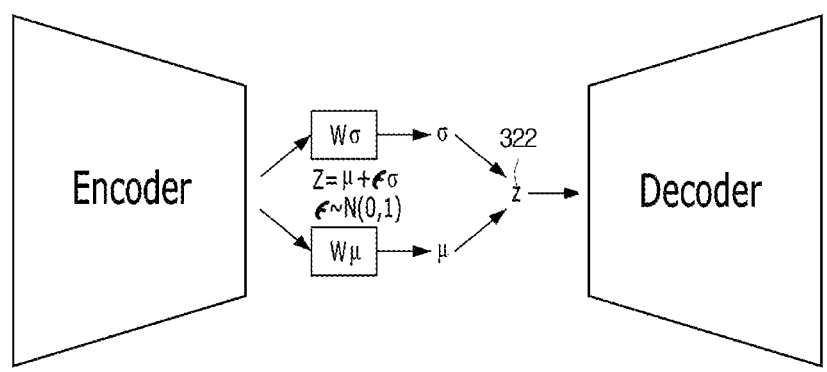
FIG. 3 is a general conceptual diagram of a generative model having an encoder-decoder structure according to an exemplary embodiment of the present disclosure.

FIG. 3 is a general conceptual diagram of a generative model having an encoder-decoder structure according to an exemplary embodiment of the present disclosure.

A generative model based on an artificial neural network model having the encoder-decoder structure includes a Variational Autoencoder (VAE). In the generative model, such as the variational autoencoder, the encoder transforms the input data into the latent variable vector z 322 by utilizing a bottleneck layer (for example, referring to FIG. 3, layers corresponding to $W_\sigma$ and $W_\mu$) while preserving the characteristics of the input data. For example, the generative model described with reference to FIG. 3 is an example of a variational autoencoder architecture in the form of a transformer, and the bottleneck layer is placed between the encoder and the decoder of the T5 encoder-decoder model (Exploring the Limits of Transfer Learning with a Unified Text-to-Text Transformer, 2020, Colin Raffel et al.). Then, the decoder generates output data from the latent variable vector. The data generated by the decoder belongs to a new latent space and may have a form similar to that of the input data.

The training of the artificial neural network model with the encoder-decoder structure, such as the variational autoencoder, is generally performed in the direction of inducing the output data to be similar to the input data. However, this training method tends to cause a phenomenon called posterior collapse, so that the training of the model is not performed properly.

The posterior collapse means that in the training of the generative model having the encoder-decoder structure, when it exceeds a certain level, the decoder layer is not properly trained and all characteristics of the input data are forgotten, resulting in outputting a random matrix.

The model of the present disclosure takes the configuration of the pre-training of the artificial neural network model of the encoder-decoder structure and the unique model construction, so that due to the specificity of the training method and the model architecture, the model is trained while preventing the posterior collapse, thereby contributing to successfully generate new data from the input data. As a result, due to the present disclosure, the generative model having the encoder-decoder structure may exhibit significantly higher performance than the method in the related art.

Figure 4:
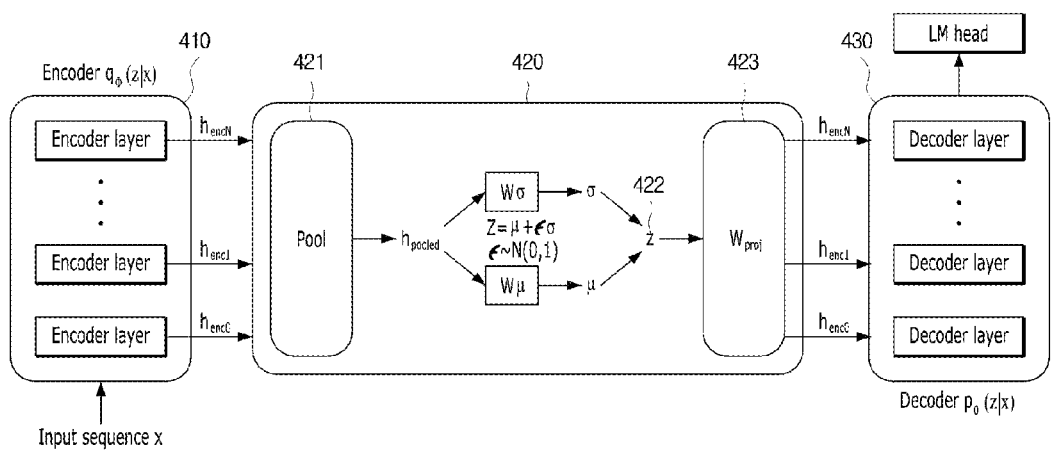
FIG. 4 is a conceptual diagram illustrating the structure of an artificial neural network model according to an exemplary embodiment of the present disclosure.

FIG. 4 is a conceptual diagram illustrating the structure of the artificial neural network model according to the exemplary embodiment of the present disclosure.

The artificial neural network model of the present disclosure may include an encoder layer 410, a latent vector layer 420, and a decoder layer 430. Further, the latent vector layer 420 may include a pooling layer 421, a latent vector 422, and a projection matrix 423.

In the exemplary embodiment of FIG. 4, the artificial neural network model of the encoder-decoder structure that is the basis has the form of a transformer, but in the present disclosure, artificial neural network models of various encoder-decoder structures including the transformer may be used. Hereinafter, a method for constructing an artificial neural network model of the present disclosure will be described in the case where a model of the encoder-decoder structure is based on a transformer.

The encoder layer 410 of the artificial neural network model of the present disclosure may include one or more encoders. In the present disclosure, the pre-trained encoder layer 410 may receive input data in the form of a sequence, output an encoded vector, and pass data to a latent vector layer.

In the present disclosure, the latent vector layer 420 may include a pooling layer 421, a latent vector layer 422, and a projection matrix 423. In the pooling layer 421, the vector output by the encoder may be max-pooled or mean-pooled. In this case, the dimension of the pooled vector $h_{pooled}$ may be the same as the dimension of the hidden layer of the encoders.

In the latent vector layer 420, the pooled vector may be transformed into the latent variable vector 422 as in Equation 1.

$$z=\mu+\sigma\odot\varepsilon, \varepsilon\sim N(0,1) \quad \text{[Equation 1]}$$

In this case, z may be a latent variable vector, $\mu$ may be a mean vector, $\sigma$ may be a standard deviation vector, and $\varepsilon$ may be a real number between 0 and 1. The mean vector and the standard deviation vector may be calculated as represented in Equation 2.

$$\mu=h_{pooled}W_\mu, \log_\sigma=h_{pooled}W_\sigma \quad \text{[Equation 2]}$$

The latent variable vector 422 may be inserted into all decoders constituting the decoder layer 430. In this case, in order to match the dimension of the input vector, the latent variable vector may be used as an input value of the decoder layer through a projection matrix $W_{proj}$ 423, and cross attention of the decoder layer 430 may be performed based on the latent variable vector and the projection matrix.

The cross attention is an attention that occurs between the encoder and the decoder among the three attentions that occur in a neural network of a transformer structure, and a key value and a value value refer to the encoder, and a query value refers to the decoder. In this case, when the cross attention of the decoder layer 430 is performed, the key value and the value value of the decoder layer 430 may be calculated as in Equation 3.

$$(K_{ca}, V_{ca})=(zW_{proj}, zW_{proj}) \quad \text{[Equation 3]}$$

In this case, $C_a$ may be the key value of the decoder cross attention, and $V_{ca}$ may be the value value of the cross attention of the decoder layer. A person skilled in the art will be able to properly understand the structure of the model architecture and the flow of data appearing in the exemplary embodiments of the present disclosure.

In the exemplary embodiment of the present disclosure, after inserting the latent vector layer 420 into the artificial neural network model of the pre-trained encoder-decoder structure as in the above-described method, the second operation of the training process of the artificial neural network model may be performed. Specifically, the processor 110 may tune the artificial neural network so that the artificial neural network model in which the latent vector layer is inserted denoises the input data. Through this process, the artificial neural network model may train the probability distribution of the input data.

The artificial neural network constructed and pre-trained and tuned through the above-described process may function as a generative model that generates new data by learning the probability distribution of the input data.

Figure 5:
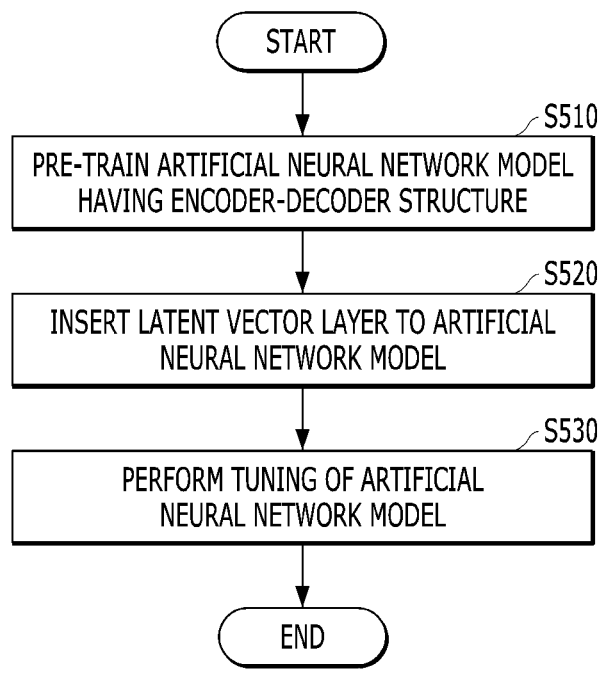
FIG. 5 is a flowchart illustrating a training method of a model according to an exemplary embodiment of the present disclosure.

FIG. 5 is a flowchart illustrating a training method of a model according to an exemplary embodiment of the present disclosure.

According to FIG. 5, a method of training a model according to the present disclosure includes an operation S510 of pre-training an artificial neural network model having an encoder-decoder structure, an operation S520 of inserting a latent vector layer into the artificial neural network model, and an operation S530 of tuning the artificial neural network model.

In operation S510, the artificial neural network model having the encoder-decoder structure may be pre-trained. As the exemplary embodiment of the pre-training method, for example, a method (encoder warm-up) of pre-training the encoder layer until a value of the loss function of the encoder layer of the artificial neural network having the encoder-decoder structure becomes equal to or less than a threshold value may be used. As another exemplary embodiment of the pre-training method, a method of training a model so as to denoise original data based on inputting data in which at least part of the data has been noised to an artificial neural network model having an encoder-decoder structure may be used. The method of first training the encoder layer and the method of pre-training the artificial neural network by inputting data in which at least a part of the data has been noised have been described in detail with reference to FIG. 1.

The method of first training the encoder layer and the method of inputting data in which at least a part of the data has been noised may be simultaneously applied to one artificial neural network of the encoder-decoder structure, and when both methods are used, the finally completed model may operate more robustly. Specific results generated when the foregoing two methods are simultaneously applied were described above with reference to FIG. 1.

In operation S520, a latent vector layer may be inserted between the encoder layer and the decoder layer of the artificial neural network model of the pre-trained encoder-decoder structure. In general, the artificial neural network model of the encoder-decoder structure may be classified as a discrimination model. However, by inserting the latent vector layer into the artificial neural network model of the encoder-decoder structure, the corresponding model may function as a generative model. The detailed configuration of the latent vector layer and the flow of data generated by inserting the latent vector layer have been described with reference to FIG. 4.

In operation S530, fine-tuning of the artificial neural network model in which the pre-training and the insertion of the latent vector layer have been completed may be performed. Specifically, for example, the artificial neural network model may be trained so as to output data similar to input data.

In the case of the present disclosure, the artificial neural network may be tuned to learn the probability distribution of the input data by inducing the data output by the artificial neural network model in a direction similar to the input data in operation S530 by using the weights formed by the artificial neural network model pre-trained in operation S510. Through the tuning process, the artificial neural network may be properly trained for the purpose of data generation, but the present disclosure is not limited thereto.

When the generative model is constructed by the method of inserting the latent vector layer into the artificial neural network model of the pre-trained encoder-decoder structure and then tuning the artificial neural network model, the model may be properly trained without the posterior collapse that often occurs during the training process of generative models. In addition, when the exemplary embodiment of the pre-training method is simultaneously applied, the finally completed model may operate more robustly despite the complexity of the model of the encoder-decoder structure that serves as the basis.

In the meantime, according to an exemplary embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons". The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 6:
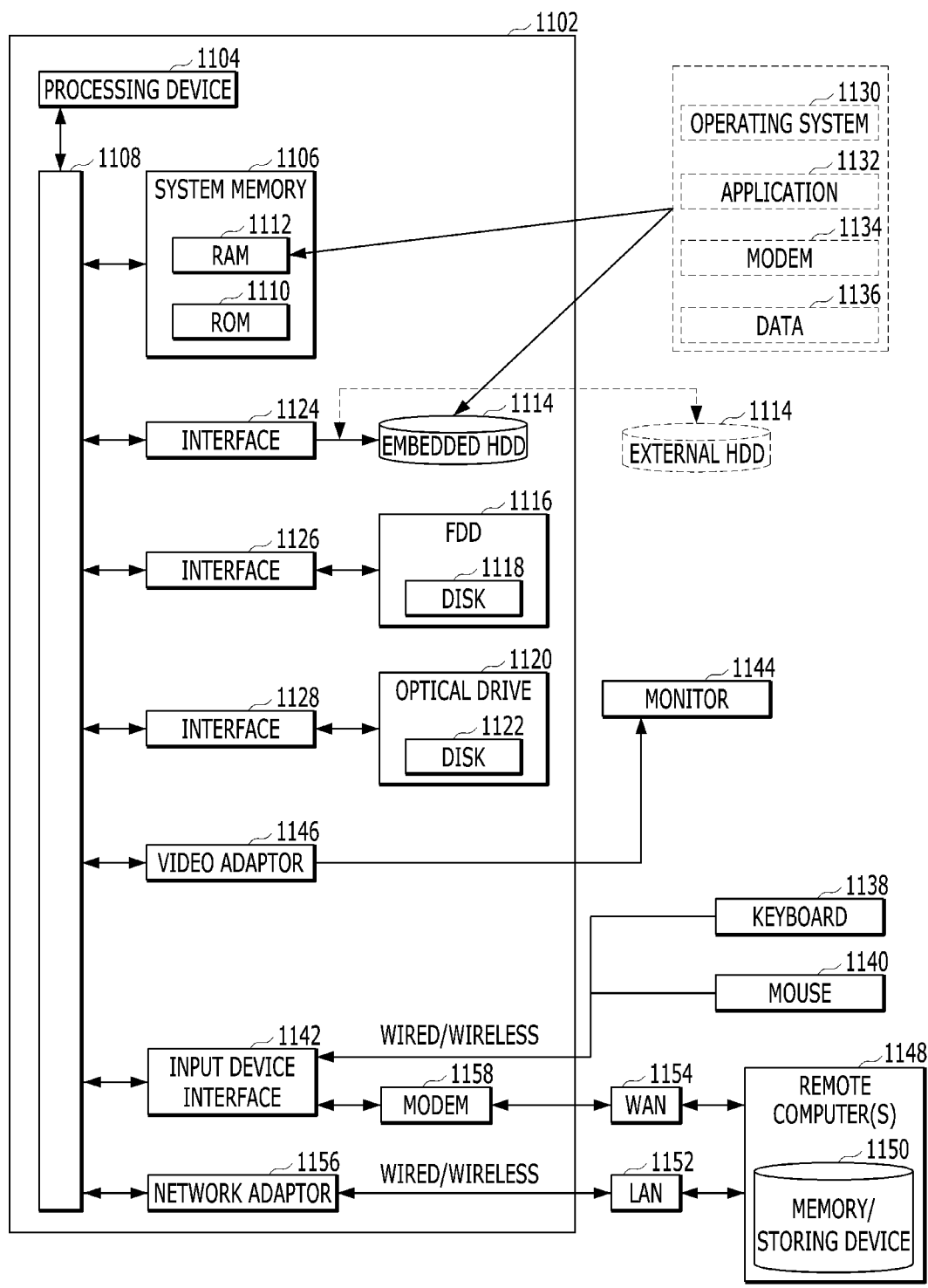
FIG. 6 is a simple and general schematic diagram illustrating an example of a computing environment in which the exemplary embodiments of the present disclosure are implementable.

FIG. 6 is a simple and general schematic diagram illustrating an example of a computing environment in which the exemplary embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

What is claimed is:

1. A method performed by one or more processors of a computing device for generating data based on input data, the method comprising:
   generating new data based on a probability distribution of the input data by using an artificial neural network model having an encoder-decoder structure,
   wherein the artificial neural network model having the encoder-decoder structure corresponds to an artificial neural network model trained based on:
   pre-training an encoder layer and an decoder layer of the artificial neural network model, wherein the pre-training step includes determining a weight;
   inserting a latent vector layer between the encoder layer and the decoder layer of the artificial neural network model, wherein the inserting the of the latent vector layer between the encoder layer and the decoder layer of the artificial neural network model includes:

transforming an output of the encoder layer into a pooling vector;
transforming the pooling vector into a latent variable vector; and
using the latent variable vector as an input value of the decoder layer through a projection matrix, wherein the using of the latent variable vector as the input value of the decoder layer through the projection matrix includes: performing cross attention of the decoder layer based on the latent variable vector and the projection matrix; and
tuning the artificial neural network so that the artificial neural network denoises the input data, wherein the tuning comprises inducing output data to approach the input data based on the determined weight.

2. The method of claim 1, wherein the artificial neural network model having the encoder-decoder structure includes a transformer.

3. The method of claim 1, wherein the pre-training the encoder layer and the decoder layer of the artificial neural network model includes pre-training the encoder layer until a value of a loss function of the encoder layer of the artificial neural network having the encoder-decoder structure becomes equal to or less than a threshold value.

4. The method of claim 3, further comprising:
pre-training the encoder layer and the decoder layer of the artificial neural network model by using data in which at least a part of the data has been noised as input data of the artificial neural network model.

5. The method of claim 4, wherein the using of the data in which at least a part of the data has been noised as the input data of the artificial neural network model includes:
masking some of the input data of the artificial neural network model; and
inputting the masked input data to the artificial neural network model, and
the input data of the artificial neural network model includes text data.

6. A method of training a model, the method comprising:
pre-training an encoder layer of an artificial neural network model having an encoder-decoder structure;
inserting a latent vector layer between the encoder layer and a decoder layer of the artificial neural network model, wherein the inserting the of the latent vector layer between the encoder layer and the decoder layer of the artificial neural network model includes:
transforming an output of the encoder layer into a pooling vector;
transforming the pooling vector into a latent variable vector; and
using the latent variable vector as an input value of the decoder layer through a projection matrix, wherein the using of the latent variable vector as the input value of the decoder layer through the projection matrix includes: performing cross attention of the decoder layer based on the latent variable vector and the projection matrix; and
tuning the artificial neural network model so that the artificial neural network denoises input data, wherein the tuning comprises inducing output data to approach the input data based on the determined weight.

7. A computer program stored in a non-transitory computer readable storage medium including instructions for causing a computing device to perform operations, the operations comprising:
an operation of generating new data based on a probability distribution of input data by using an artificial neural network model having an encoder-decoder structure,
wherein the artificial neural network model having the encoder-decoder structure corresponds to an artificial neural network model trained based on:
pre-training an encoder layer and an decoder layer of the artificial neural network model, wherein the pre-training step includes determining a weight;
inserting a latent vector layer between the encoder layer and the decoder layer of the artificial neural network model, wherein the inserting the of the latent vector layer between the encoder layer and the decoder layer of the artificial neural network model includes:
transforming an output of the encoder layer into a pooling vector;
transforming the pooling vector into a latent variable vector; and
using the latent variable vector as an input value of the decoder layer through a projection matrix, wherein the using of the latent variable vector as the input value of the decoder layer through the projection matrix includes: performing cross attention of the decoder layer based on the latent variable vector and the projection matrix; and
tuning the artificial neural network so that the artificial neural network denoises the input data, wherein the tuning comprises inducing output data to approach the input data based on the determined weight.

8. A computing device, comprising:
a processor including one or more cores;
a network unit for receiving one or more data; and
a memory,
wherein the processor configured to generate new data based on a probability distribution of input data by using an artificial neural network model having an encoder-decoder structure, and
the artificial neural network model having the encoder-decoder structure corresponds to an artificial neural network model trained based on:
pre-training an encoder layer and an decoder layer of the artificial neural network model, wherein the pre-training step includes determining a weight;
inserting a latent vector layer between the encoder layer and the decoder layer of the artificial neural network model, wherein the inserting the of the latent vector layer between the encoder layer and the decoder layer of the artificial neural network model includes:
transforming an output of the encoder layer into a pooling vector;
transforming the pooling vector into a latent variable vector; and
using the latent variable vector as an input value of the decoder layer through a projection matrix, wherein the using of the latent variable vector as the input value of the decoder layer through the projection matrix includes: performing cross attention of the decoder layer based on the latent variable vector and the projection matrix; and
tuning the artificial neural network so that the artificial neural network denoises the input data, wherein the tuning comprises inducing output data to approach the input data based on the determined weight.

* * * * *